(12) United States Patent
Sim et al.

(10) Patent No.: US 7,917,580 B2
(45) Date of Patent: Mar. 29, 2011

(54) METHOD FOR MONITORING ACTIVITIES OF A FIRST USER ON ANY OF A PLURALITY OF PLATFORMS

(75) Inventors: Wong Hoo Sim, Singapore (SG); Seh Eing Lim, Singapore (SG)

(73) Assignee: Creative Technology Ltd, Singapore (SG)

( * ) Notice: Subject to any disclaimer, the term of this patent is extended or adjusted under 35 U.S.C. 154(b) by 95 days.

(21) Appl. No.: 12/479,757

(22) Filed: Jun. 5, 2009

(65) Prior Publication Data

US 2010/0312876 A1    Dec. 9, 2010

(51) Int. Cl.
*G06F 7/00* (2006.01)
(52) U.S. Cl. ........ 709/203; 709/220; 709/227; 707/710; 348/143

(58) Field of Classification Search .................. 709/203, 709/220, 227, 228; 707/710
See application file for complete search history.

(56) References Cited

U.S. PATENT DOCUMENTS

| | | | | |
|---|---|---|---|---|
| 7,477,285 B1 * | 1/2009 | Johnson | .......... | 348/143 |
| 7,720,835 B2 * | 5/2010 | Ward et al. | .......... | 707/710 |
| 2006/0022048 A1 * | 2/2006 | Johnson | .......... | 235/462.1 |
| 2008/0168050 A1 * | 7/2008 | Reyes et al. | .......... | 707/5 |
| 2010/0131584 A1 * | 5/2010 | Johnson | .......... | 709/203 |

* cited by examiner

*Primary Examiner* — Khanh Q Dinh

(57) ABSTRACT

There is provided a method for monitoring activities of a first user on any of a plurality of platforms, with the first user having access to a first computing device for use by the first user. The method may include two modes which allows a master user to monitor activities of the first user even when the master user is not connected to the world wide web (offline).

24 Claims, 4 Drawing Sheets

METHOD FOR MONITORING ACTIVITIES OF A FIRST USER ON ANY OF A PLURALITY OF PLATFORMS

FIELD OF INVENTION

The present invention relates to the field of monitoring activities of a single party, particularly for activities enabled by a computing device in a context of at least one of, convenience in monitoring (child supervision) and enhancing workplace productivity (employee supervision).

BACKGROUND

Modern society has undoubtedly embraced the current information age in a favourable manner. Every country in the world considers the plethora of information available on the world wide web to be beneficial to their populace, and this has consequently led to heavy investment on data transmission infrastructure by governments in many countries to enable as many people as possible to access the information available on the world wide web. Thus, the heavy investment has led to economical and convenient access to the world wide web for people in many countries.

Unfortunately, the economical and convenient access to the world wide web has led to a set of problems which should not be overlooked. While a lot of the information on the world wide web is typically beneficial, a substantial portion of the information on the world wide web offers questionable benefit, where a person would need to apply both discretion and good sense when identifying aspects of the information which are beneficial and aspects of the information which are not beneficial. The identification of the aspects which are beneficial are usually easily carried out by people who have a certain level of maturity and perspective. However, children typically lack the level of maturity and perspective, and they may consequently be guided/misled in an inappropriate manner when they are unable to distinguish aspects of the information which are not beneficial.

The economical and convenient access to the world wide web has also led to an increasing incidence of communications being carried out over the world wide web. While communications being carried out over the world wide web has resulted in lowering of communications costs, the ease of communications with unfamiliar parties in, for instance, online chat rooms, social networking portals and so forth has led to a need for a person to apply both discretion and good sense during communications to avoid being preyed upon. Avoiding online "predators" is easier for people who have a certain level of maturity and perspective. However, children typically lack the level of maturity and perspective, and they may consequently be guided/misled in an inappropriate manner.

In addition, the easy and convenient access to the world wide web has led to efficiency issues in an office environment. While a lot of the information on the world wide web is typically beneficial for use in any particular profession, a substantial portion of the information on the world wide web offers questionable benefit and may cause unnecessary distractions to any person. A situation may arise whereby a person may be at a workstation but no work is actually being carried out by the person. This is detrimental to an efficiency of the person, and consequently an organization.

There are currently a variety of software applications which may be employed to monitor access to the world wide web. However, the aforementioned software applications typically rely on blocking of known (pre-defined) undesirable websites on the world wide web, and such a method is rather ineffective given the ease in setting up a website by third parties and the effectiveness of a search engine for the world wide web, such as, for example, Google, Yahoo, MSN, and so forth. The software applications are also locally installed, which leads to a higher probability of the software being subject to tampering. In addition, the aforementioned software applications are typically PC-based applications, leading to some difficulty in relation to monitoring access to the world wide web on devices other than PCs.

In view of the aforementioned issues, it would be desirable to attain a solution which is able to effectively monitor activities carried out by users at a computing device.

SUMMARY

There is provided a method for monitoring activities of a first user on any of a plurality of platforms, with the first user having access to a first computing device for use by the first user. The method includes either detecting power consumption of the first computing device above a pre-determined level or detecting at least one of predetermined words, predetermined URLs entered by the first user on the first computing device; capturing screenshots of a display of the first computing device at pre-determined intervals; storing the screenshots in a storage device; capturing text input into the first computing device by the first user; storing the text input in the storage device; capturing audio input at the first location by the first user; storing the audio input in the storage device; capturing URLs of internet pages visited by the first user using the first computing device; storing the URLs in the storage device; capturing video of the first user at the first location; and storing the video in the storage device. It is advantageous that a master user at any location is able to monitor the activities of the first user in a first mode when a master computing device at any location is offline, and in a second mode then the master computing device at any location is online.

The pre-determined level may be a power level for a stand-by mode of the first computing device. In addition, the pre-determined time intervals may be durations such as, for example, quarter minute, half a minute, one minute, three minutes, five minutes, and ten minutes. The audio input at the location of the first user may preferably include audio input into the first computing device. Capturing text input may preferably include counting keystrokes of the first user.

The storage device may preferably be functionally connected to the first computing device either via a wired connection or via a wireless connection, with the wireless connection being via a network. The storage device that may be functionally connected to the first computing device via the network may be an online service/storage facility. The online service/storage facility may consolidate all captured activities of the first user across the plurality of first computing devices to enable review by the master user at a subsequent juncture.

The URLs of internet pages visited by the first user using the first computing device may includes information relating to a duration spent viewing each URL, with the duration spent viewing each URL being the time that the URL is in an active browser window.

The method may be enabled in the first computing device by either running a software application on the first computing device or by functionally connecting the first computing device to an apparatus that facilitates the method to be run on the first computing device.

It is preferable that in the second mode, the method further includes alerting the master user with the master computing device of the detection of either power consumption of the first computing device above the pre-determined level or at least one of predetermined words, predetermined URLs entered by the first user on the first computing device; replicating the screenshots in sequential order on a screen of the master computing device; parsing the stored text input by the first user, seeking either pre-determined words or pre-determined combinations of alphanumeric characters; converting the either pre-determined words or pre-determined combinations of alphanumeric characters into an audio form; and either playing back the audio form of the either pre-determined words or pre-determined combinations of alphanumeric characters on the master computing device; or playing back the audio input by the first user on the master computing device. There may also be further inclusion of playing back the video of the first user at a location of the first user on the master computing device. There may also be further inclusion of using the master computing device to either partially or fully disable the first computing device. The master user may also use the master computing device to enable communication with the first user.

The master user may be alerted by a notification generated by the second computing device in a form such as, for example, visual, aural, vibrational, any combination of the aforementioned and the like. The notification may be transmitted using channels such as, for example, email, SMS, RSS updates and so forth.

The parsing of the stored text input may be done with reference to an updatable list of either the pre-determined words or the pre-determined combinations of alphanumeric characters.

It is preferable that the screenshots are in a form which renders the content to be visually inoffensive to all parties viewing the video, the form being for example, reverse colour, negative monochrome, colour filtered and so forth.

The second mode may also further include the master user referring to the first user's scheduler to ascertain a validity of the activities by the first user.

It is preferable that in the first mode, the method further includes: consolidating page captures of the URLs of internet pages visited by the first user using the first computing device; storing the consolidated page captures at the storage device; and when the master computing device is online, either presenting the URLs of internet pages visited by the first user using the first computing device when the master computing device is online, or presenting a video of the consolidated page captures of the URLs of internet pages visited by the first user using the first computing device.

It is preferable that the video of the consolidated page captures indicates a duration spent viewing each URL, with the duration spent viewing each URL being the time that the URL is in an active browser window. The video may be played back at an accelerated frame rate to minimize a time which the master user needs to view the video. The video may preferably be in a form which renders the content to be visually inoffensive to all parties viewing the video, the form being for example, reverse colour, negative monochrome, colour filtered and so forth.

It is also preferable that the URLs of internet pages visited by the first user using the first computing device indicates a duration spent viewing each URL, with the duration spent viewing each URL being the time that the URL is in an active browser window.

The page captures may be scaled down to fit a single video frame, with an actual content of each page capture being less important than a topical emphasis of the page capture. The first mode may further including the master user referring to the first user's scheduler to ascertain a validity of the activities by the first user.

The method may advantageously be disabled when either the power consumption of the first computing device is below the pre-determined level or processor usage of the first computing device is below a pre-determined percentage of a full capability of the processor.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
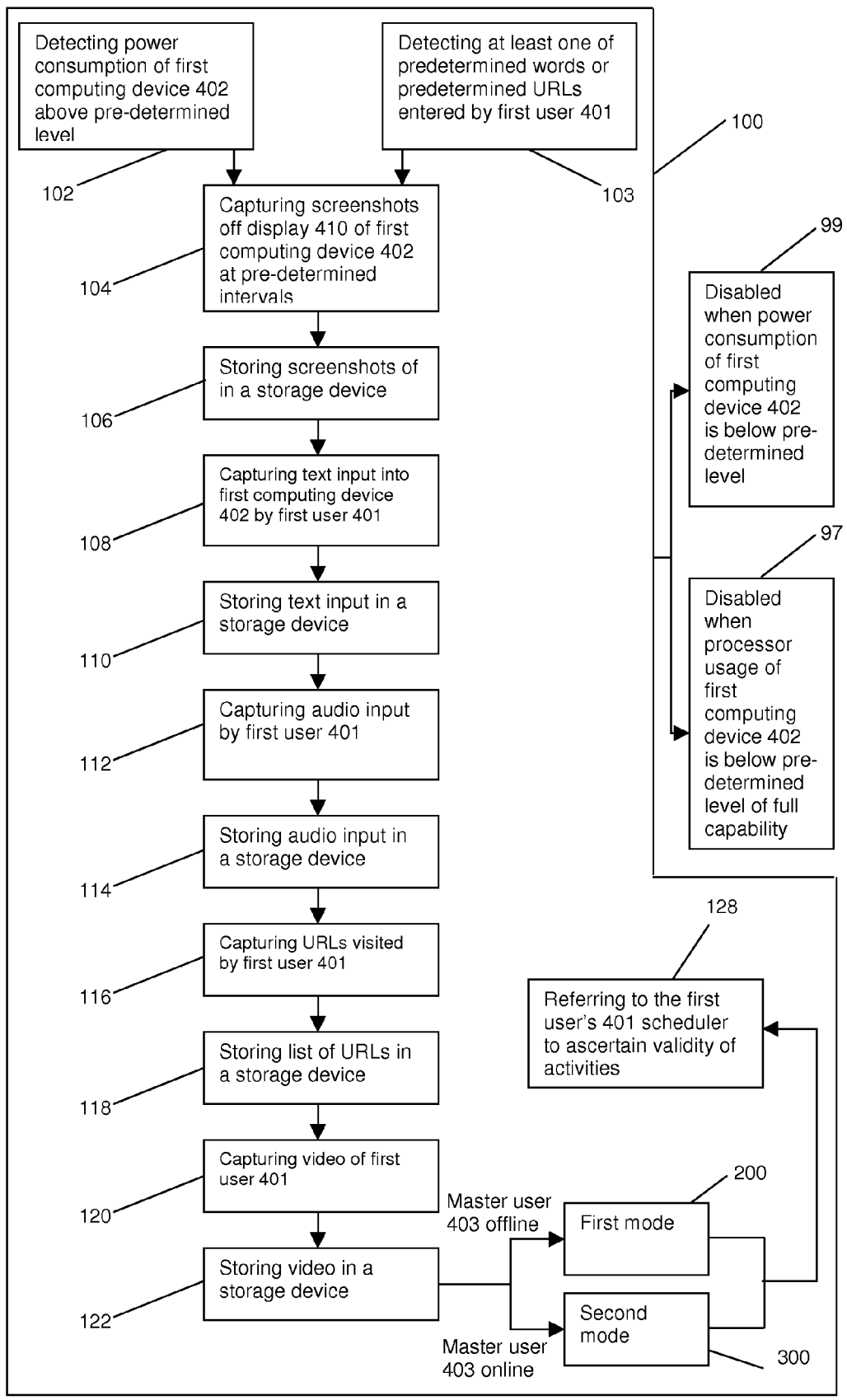
FIG. 1 shows a process flow for a method of the present invention.
Figure 4:
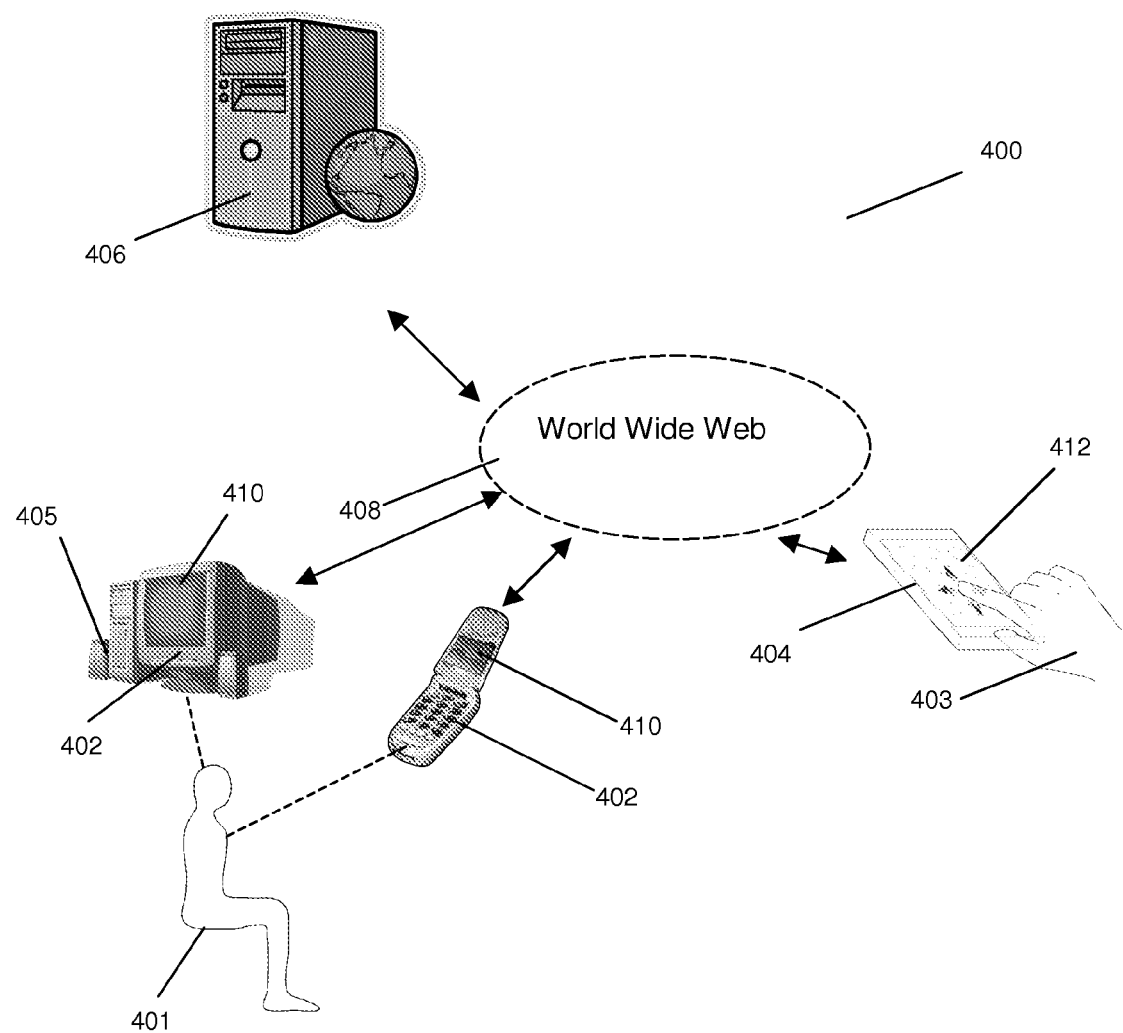
FIG. 4 shows an overview of a system enabling the method of FIG. 1.

Referring to FIGS. 1 and 4, there is shown a method 100 and a system 400 respectively for monitoring activities of a first user 401 on any one of a plurality of platforms. Each of the plurality of platforms is a first computing device 402 used by the first user 401. The first computing device 402 may include any one of, for example, a personal computer (as shown in FIG. 4), a notebook computer, a netbook computer, a tablet computer, a home entertainment media centre, a mobile phone (also shown in FIG. 4), and so forth. It should be appreciated that mobile phone includes all types of mobile phones including, for example, smart phones, telecommunications enabled mobile devices, and so forth. The monitoring of activities of the first user 401 may be for either ensuring a safety of the first user 401 or assessing an effectiveness/productivity of the first user 401. It should be appreciated that the method 100 may be enabled in the first computing device 402 by either running a software application on the first computing device 402 or by functionally connecting the first computing device 402 to a peripheral apparatus 405 that facilitates the method 100 to be run on the first computing device 402. Running the software application on the first computing device 402 may be by either locally installing the software application on the first computing device 402 or remotely accessing the software application hosted on an online service/storage facility 406. The peripheral apparatus 405 may be usable in a plug-and-play manner, and the peripheral apparatus 405 may be of a form which may be concealed within the first computing device 402. It is preferable that the software application may be not easily detectable and not easily de-activated once detected. The online service/storage facility 406 may be a server which is able to run applications that is able to process data sent to the online service/storage facility 406. When the online service/storage facility 406 processes data, the online service/storage facility 406 may be able to, for example, render images, compile images into either a slideshow or video, playback video, transmit notifications, and so forth.

It is advantageous that the method 100 is able to allow a master user 403 at any location to monitor the activities of the first user 401 in a first mode 200 when a master computing device 404 at any location is offline (not connected to the world wide web 408), and in a second mode 300, when the master computing device 404 at any location is online (connected to the world wide web 408). While the master computing device 404 is shown to be a portable handheld device, the master computing device 404 may also be, for example, a personal computer, a notebook computer, a netbook computer, a tablet computer, a home entertainment media centre, a mobile phone, and so forth. It should be appreciated that mobile phone includes all types of mobile phones including, for example, smart phones, telecommunications enabled mobile devices, and so forth. More detailed explanations of the first mode 200 and the second mode 300 will be provided in subsequent portions of the description.

The method 100 for monitoring activities of the first user 401 includes detecting power consumption of the first computing device 402 above a pre-determined level (102). The pre-determined level of power consumption is a power level for a stand-by mode of the first computing device 402. This is because the power level above the pre-determined level indicates that the first computing device 402 is operational and that the first user 401 may be engaging in activities with the first computing device 402. Correspondingly, the method 100 may be disabled at any instance when the power consumption of the first computing device 402 is below the pre-determined level (99) as such instances indicate that the first user 401 is not engaging in activities with the first computing device 402. Alternatively, the method 100 may also be disabled when processor usage of the first computing device 402 is below a pre-determined percentage of a full capability of the processor (idle mode) (97) as such instances also indicate that the first user 401 is not engaging in activities with the first computing device 402. In this regard, disabling the method 100 at any instance when either the power consumption of the first computing device 402 is below the pre-determined level, or the processor usage of the first computing device 402 is below a pre-determined percentage of a full capability of the processor (in idle mode) may be a measure to minimize unnecessary monitoring of the first user 401 in relation to data captured during monitoring of the first user 401.

Alternatively, the method 100 may include detecting at least one of predetermined words, predetermined URLs entered by the first user 401 (103). This is because entering the at least one of predetermined words, the predetermined URLs indicates that the first user 401 may be engaging in questionable activities using the first computing device 402. The predetermined words, URLs may be drawn from an updatable alert list. The alert list is updatable to maintain a relevancy of the alert list in view of the evolution of languages and web sites.

The method 100 also includes capturing screenshots off a display 410 of the first computing device 402 at pre-determined intervals (104). The pre-determined time intervals may be durations such as, for example, quarter minute, half a minute, one minute, three minutes, five minutes, ten minutes, and so forth. It should be noted that the screenshots indicate what the first user 401 is viewing on the display 410, and the activities of the first user 401 may be correspondingly inferred from the screenshots. For example, the screenshots would be able to provide information on whether the first user 401 is using the first computing device 402 for doing programming, accessing the world wide web 408, playing games, consuming media content, or doing correspondence such as, for example, emails, instant messaging, letters, and so forth. The screenshots may be stored in a storage device (106), where the storage device is functionally connected to the first computing device 402 either via a wired connection or via a wireless connection. The wireless connection may be via a network. The storage device may be either incorporated within the first computing device 402 or an online service/storage facility 406. The captured screenshots may be stored in the storage device incorporated within the first computing device 402 if the first computing device 402 is not connected to the world wide web 408, and the captured screenshots may be subsequently transferred to the online service/storage facility 406 when the first computing device 402 is connected to the world wide web 408. Alternatively, the captured screenshots may be stored directly onto the online service/storage facility 406 when the first computing device 402 is connected to the world wide web 408. Storing the captured screenshots in the storage device incorporated within the first computing device 402 may be more accessible to the first user 401, and should be avoided to minimize an incidence of tampering of the stored captured screenshots. It should be appreciated that the online service/storage facility 406 may only be accessed by the master user 403, not necessarily with the master computing device 404.

In addition, the method 100 also includes capturing text input into the first computing device 402 by the first user 401 (108). It should be appreciated that the text input may be in any language and the text input is able to denote the activities of the first user 401 at the first computing device 402. For example, the text input would be able to provide information on whether the first user 401 is using the first computing device 402 for doing programming, accessing the world wide web 408, playing games, consuming media content, or doing correspondence such as, for example, emails, instant messaging, letters, and so forth. Capturing the text input may also include counting keystrokes of the first user 401. The captured text input may be stored in a storage device (110), where the storage device is functionally connected to the first computing device 402 either via a wired connection or via a wireless connection. The wireless connection may be via a network. The storage device may be either incorporated within the first computing device 402 or an online service/storage facility 406. The captured text input may be stored in the storage device incorporated within the first computing device 402 if the first computing device 402 is not connected to the world wide web 408, and the captured text input may be subsequently transferred to the online service/storage facility 406 when the first computing device 402 is connected to the world wide web 408. Alternatively, the captured text input may be stored directly onto the online service/storage facility 406 when the first computing device 402 is connected to the world wide web 408. Storing the captured text input in the storage device incorporated within the first computing device 402 may be more accessible to the first user 401, and should be avoided to minimize an incidence of tampering of the stored captured text input.

There is also inclusion of capturing of audio input by the first user 401 (112) in the method 100. The audio input by the first user 401 includes audio input into the first computing device 402, for example, during a communications session to another party using the first computing device 402. The audio input by the first user 401 may also include conversations of the first user 401, whether to a person(s) at a location of the first user 401 or into a telephone. It should be appreciated that the audio input may be captured using a microphone functionally connected to the first computing device 402. The audio input is also able to denote the activities of the first user 401 at the first computing device 402. For example, the audio input would be able to provide information on whether the first user 401 is using the first computing device 402 for doing programming, accessing the world wide web 408, playing games, consuming media content, or doing correspondence such as, for example, emails, instant messaging, letters, and so forth. The captured audio input may be stored in a storage device (114), where the storage device is functionally connected to the first computing device 402 either via a wired connection or via a wireless connection. The wireless connection may be via a network. The storage device may be either incorporated within the first computing device 402 or an online service/storage facility 406. The captured audio input may be stored in the storage device incorporated within the first computing device 402 if the first computing device 402 is not connected to the world wide web 408, and the captured audio input may be subsequently transferred to the online service/storage facility 406 when the first computing device 402 is connected to the world wide web 408. Alternatively, the captured audio input may be stored directly onto the online service/storage facility 406 when the first computing device 402 is connected to the world wide web 408. Storing the captured audio input in the storage device incorporated within the first computing device 402 may be more accessible to the first user 401, and should be avoided to minimize an incidence of tampering of the stored captured audio input.

The method 100 may also include capturing URLs of internet pages visited by the first user 401 while using the first computing device 402 (116). The URLs visited by the first user 401 is also able to denote the activities of the first user 401 at the first computing device 402. The URLs of internet pages visited by the first user 401 using the first computing device 402 may include information relating to a duration the first user 401 spent viewing each URL, with the duration spent viewing each URL being the time that the URL is in an active browser window. For example, the URLs would be able to provide information on whether the first user 401 is using the first computing device 402 for doing research, playing games, consuming media content, shopping online, or doing correspondence such as, for example, emails, instant messaging, and so forth. The captured URLs may be stored in a storage device (118), where the storage device is functionally connected to the first computing device 402 either via a wired connection or via a wireless connection. The wireless connection may be via a network. The storage device may be either incorporated within the first computing device 402 or an online service/storage facility 406. The captured URLs may be stored in the storage device incorporated within the first computing device 402 if the first computing device 402 is not connected to the world wide web 408, and the captured URLs may be subsequently transferred to the online service/storage facility 406 when the first computing device 402 is connected to the world wide web 408. Alternatively, the captured URLs may be stored directly onto the online service/storage facility 406 when the first computing device 402 is connected to the world wide web 408. Storing the captured URLs in the storage device incorporated within the first computing device 402 may be more accessible to the first user 401, and should be avoided to minimize an incidence of tampering of the stored URLs. The online service/storage facility 406 may utilize the captured URLs and render images of page captures of the URLs, compile the images into either a slideshow or video, playback the video, transmit notifications, and so forth.

Also included within the method 100 is the capturing of video of the first user 401 (120). The video of the first user 401 will also be able to denote the activities of the first user 401 at the first computing device 402. The video of the first user 401 would be similar to a surveillance video of the first user 401. It should be appreciated that the video may be captured using a camera functionally connected to the first computing device 402. The camera may be concealed in the first computing device 402. Capturing of the video may occur upon detection of at least one action of movement, audio, operation of the first computing device 402. The captured videos may be stored in a storage device (122), where the storage device is functionally connected to the first computing device 402 either via a wired connection or via a wireless connection. The wireless connection may be via a network. The storage device may be either incorporated within the first computing device 402 or an online service/storage facility 406. The captured videos may be stored in the storage device incorporated within the first computing device 402 if the first computing device 402 is not connected to the world wide web 408, and the captured videos may be subsequently transferred to the online service/storage facility 406 when the first computing device 402 is connected to the world wide web 408. Alternatively, the captured videos may be stored directly onto the online service/storage facility 406 when the first computing device 402 is connected to the world wide web 408. Storing the captured videos in the storage device incorporated within the first computing device 402 may be more accessible to the first user 401, and should be avoided to minimize an incidence of tampering of the stored videos.

Figure 2:
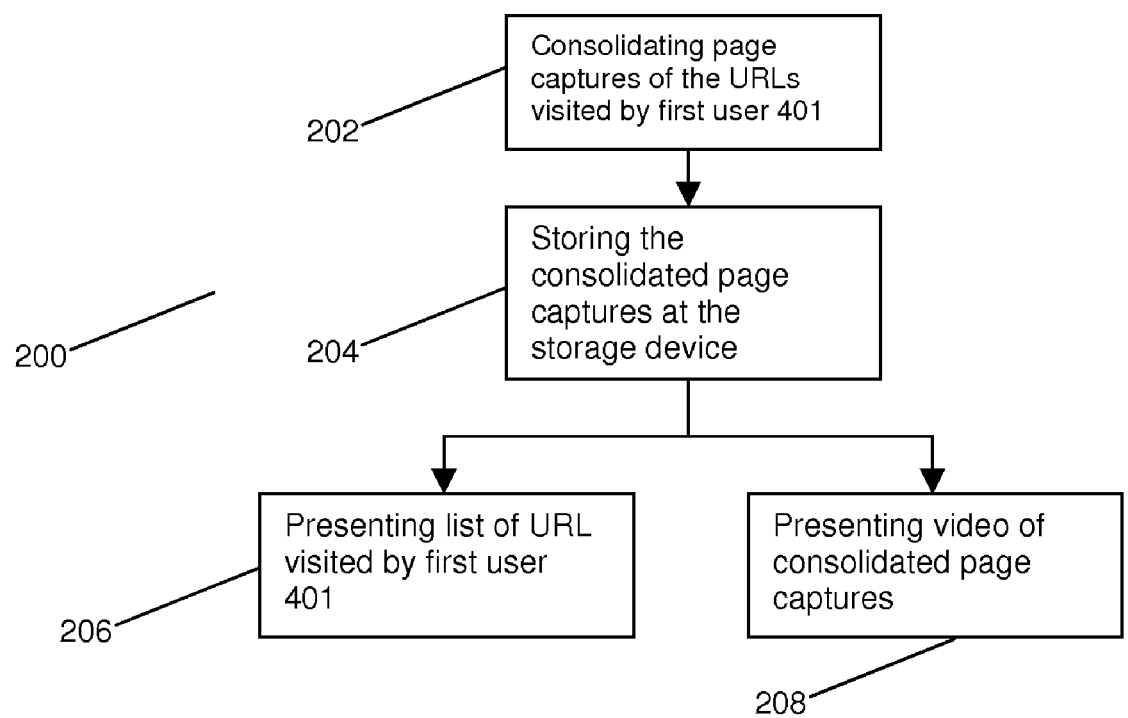
FIG. 2 shows a process flow of a first mode within the method of FIG. 1.

As mentioned earlier, the first mode 200 occurs when the master computing device 404 is offline (not connected to the world wide web 408). Reference will also be made to FIG. 2 when describing the first mode 200. This correspondingly means that the master user 403 is offline. In the first mode 200, the method 100 further includes consolidating page captures of the URLs of internet pages visited by the first user 401 using the first computing device 410 (202). The consolidation of page captures of URLs of internet pages visited by the first user 401 may be carried out by the online service/storage facility 406. The page captures of the URLs visited by the first user 401 is also able to denote the activities of the first user 401 at the first computing device 402. The page captures of the URL may be obtained either when the first user 401 is accessing the URL or at a subsequent juncture. It should be appreciated that page captures of the URL differ from screen captures as page captures do not include any content other than content at the URL. In instances when the page captures of the URL are obtained at a subsequent juncture, page captures of subscriber-only (restricted access) URLs may indicate only a log-in page. The page capture may also be scaled down to fit a single video frame, as an actual content of the page capture is less important than a topical overview of the page capture.

The URLs of internet pages visited by the first user 401 using the first computing device 402 may include information relating to a duration the first user 401 spent viewing each URL, with the duration spent viewing each URL being the time that the URL is in an active browser window. The consolidated page captures may be stored in a storage device (204), where the storage device is functionally connected to the first computing device 402 either via a wired connection or via a wireless connection. The wireless connection may be via a network. The storage device may be either incorporated within the first computing device 402 or an online service/storage facility 406. The consolidated page captures may be stored in the storage device incorporated within the first computing device 402 if the first computing device 402 is not connected to the world wide web 408, and the consolidated page captures may be subsequently transferred to the online service/storage facility 406 when the first computing device 402 is connected to the world wide web 408. Alternatively, the consolidated page captures may be stored directly onto the online service/storage facility 406 when the first computing device 402 is connected to the world wide web 408. Storing the consolidated page captures in the storage device incorporated within the first computing device 402 may be more accessible to the first user 401, and should be avoided to minimize an incidence of tampering of the consolidated page captures.

In the first mode, when the second computing device 404 is eventually online, the second user 403 may be either presented with a list of URLs of internet pages visited by the first user 401 using the first computing device 402 (206) or presented with a video of the consolidated page captures of the list of URLs of internet pages visited by the first user 401 using the first computing device 402 (208). The list of URLs of internet pages visited by the first user 401 using the first computing device 402 may include textual information relating to a duration the first user 401 spent viewing each URL, with the duration spent viewing each URL being the time that the URL is in an active browser window. The textual information may also be colour coded, where a URL being expressed in a particular colour indicates a particular period of time spent at the URL. For example, red may indicate a duration longer than ten minutes, blue may indicate a duration between five to ten minutes, and so forth.

Similarly, the video of the consolidated page captures may indicate a duration that the first user 401 spent viewing each URL, with the duration spent viewing each URL being the time that the URL is in an active browser window. It should be noted that the duration spent by the first user 401 for each page capture of each URL may be reflected in the video where the page capture in the video does not vary for the "real-time" duration spent by the first user 401. As such, it is advantageous that the video may be played back at an accelerated frame rate to minimize a time which the master user 403 needs to view the video. It should be noted that the rate of playback of the frames may be controlled by the master user 403. The video may be presented in a form which may render the content to be visually inoffensive to all parties viewing the video, such as, for example, reverse colour, negative monochrome, colour filtered, and so forth.

When in the first mode 200, the method 100 may further include the master user 403 referring to the first user's 401 scheduler to ascertain a validity of the activities by the first user 401. The master user 403 may have access to the first user's 401 scheduler, and may be able to determine whether an absence from the location of the first user 401 or activities of the first user 401 is justified.

Figure 3:
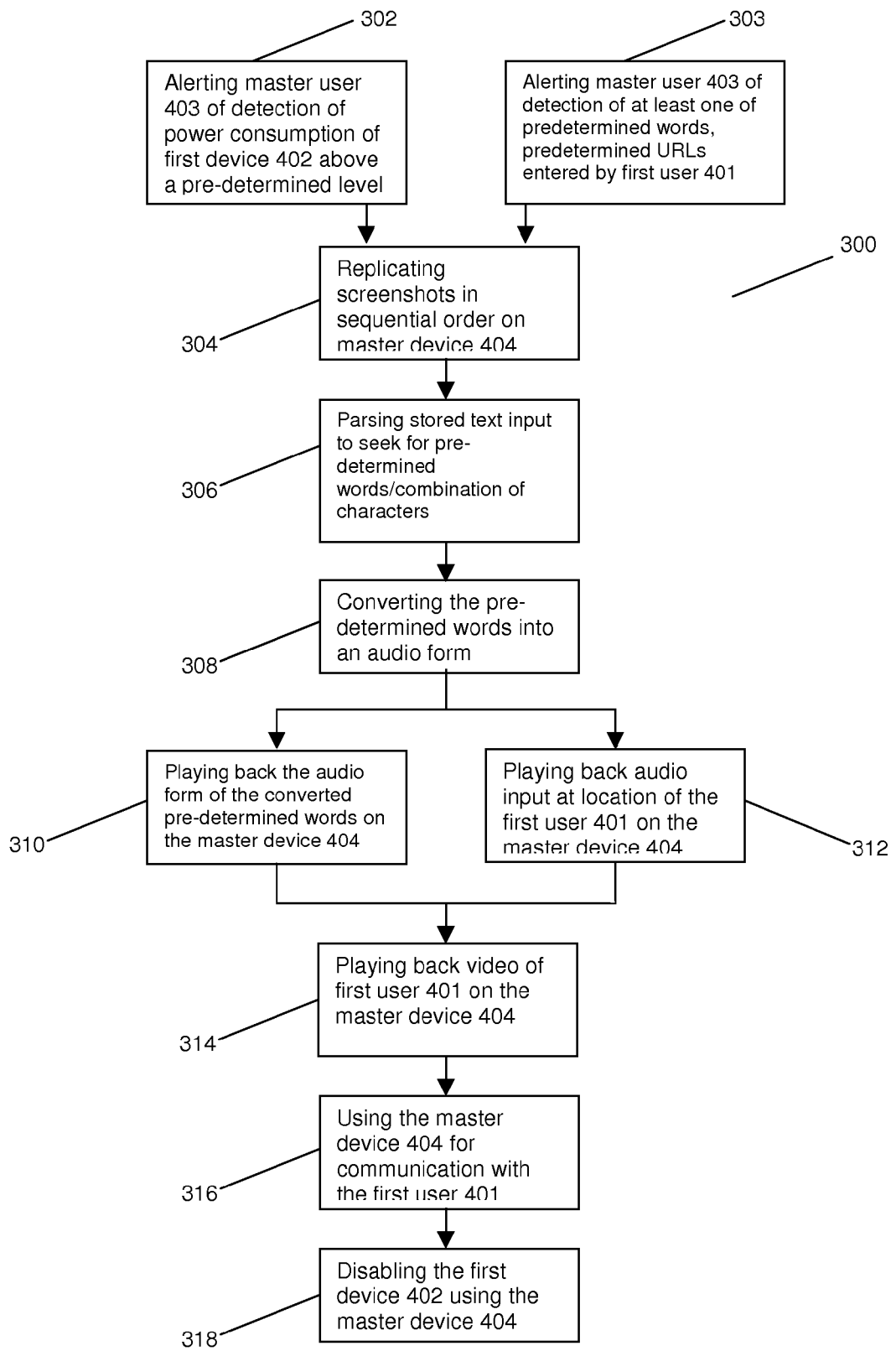
FIG. 3 shows a process flow of a second mode within the method of FIG. 1.

It was mentioned in an earlier portion that the second mode 300 occurs when the master computing device 404 at any location is online (connected to the world wide web 408). Reference will also be made to FIG. 3 when describing the second mode 300. This correspondingly means that the master user 403 is online in the second mode 300. In the second mode 300, the method 100 further includes alerting the master user 403 with the master computing device 404 of the detection of power consumption of the first computing device 402 above the pre-determined level (302). The pre-determined level of power consumption is a power level for a stand-by mode of the first computing device 402. When the power level is above the pre-determined level, the master user 403 is able to know that the first computing device 402 is operational and that the first user 401 is engaging in activities with the first computing device 402. Alternatively, the method 100 may include alerting the master user 403 with the master computing device 404 of detecting at least one of predetermined words, predetermined URLs entered by the first user 401 (303). This is because entering the at least one of predetermined words or the predetermined URLs indicates that the first user 401 may be engaging in questionable activities using the first computing device 402. The predetermined words, and URLs may be drawn from an updatable alert list. The alert list is updatable to maintain a relevancy of the alert list in view of the evolution of languages and web sites.

The master user 403 may be alerted by a notification generated by the master computing device 404, the notification being an indication such as, for example, visual, aural, vibrational, any combination of the aforementioned and so forth. The notification may be transmitted using channels such as, for example, email, SMS, RSS updates, and so forth. Once the master user 403 is aware that the first user 401 is engaging in activities with the first computing device 402, the master user 403 can then decide whether to monitor the first user 401.

In the second mode 300, the method 100 may include replicating the screenshots in sequential order on a screen 412 of the second computing device 404. This allows the master user 403 to determine whether the first user 401 is using the first computing device 402 for doing programming, accessing the world wide web 408, playing games, consuming media content, or doing correspondence such as, for example, emails, instant messaging, letters, and so forth. The screenshots may be in a form which may render the content to be visually inoffensive to all parties viewing the screenshots, such as, for example, reverse colour, negative monochrome, colour filtered, and so forth.

The method 100 may also include parsing the stored text input by the first user 401, where the parsing of the stored text input is for seeking either pre-determined words or pre-determined combinations of alphanumeric characters (306) which may be brought to the master user's 403 attention if the either pre-determined words or pre-determined combinations of alphanumeric characters are on a watch list of the master user 403. The pre-determined combinations of alphanumeric characters may include, for example, short forms of words (eg. gr8=great), representations of symbols (eg. :)=☺), texting slang (eg. c u=see you), and so forth. The parsing of the stored text input is done with reference to an updatable watch list of the either pre-determined words or pre-determined combinations of alphanumeric characters. The watch list is updatable to maintain a relevancy of the watch list in view of the evolution of languages. Subsequently, the either pre-determined words or pre-determined combinations of alphanumeric characters may be converted into an audio form (308) using a text-to-speech engine. It is preferable that the text-to-speech engine makes references to the updatable watch list to ensure that the pre-determined combinations of alphanumeric characters are converted in a manner which they are supposed to be interpreted.

In the second mode 300, there may be either play back of the audio form of the either pre-determined words or pre-determined combinations of alphanumeric characters on the master computing device 404 (310) or play back of the audio input at the location by the first user 401 on the master computing device 404 (312). This may be dependent on a preference of the master user 403. It should be appreciated that in an instance when the first user 401 did not engage in significant text input using the first computing device 402, the master user 403 would not gain much insight into the activities of the first user 401 from the play back of the audio form of the either pre-determined words or pre-determined combinations of alphanumeric characters. In addition, the master user 403 would also not gain much insight into the activities of the first user 401 if the text input did not include content from the watch list.

The second mode 300 may also further include playing back the video of the first user 401 on the master computing device 404. This allows the master user 403 to ascertain the activities of the first user 401 at the first computing device 402.

The master user 403 may have an option to use the second computing device 404 to either partially or fully disable the first computing device 402 during the second mode 300. This may be carried out by the master user 403 when the master user 403 either believes that the first user 401 is engaging in inappropriate behaviour with the first computing device 402 or wishes to impose a degree of control on the first user 401. It should be noted that using the master computing device 404 to either partially or fully disable the first computing device 402 may be enabled by firewall circumventing processes when necessary. It should be appreciated that partially disabling the first computing device 402 includes freezing/locking contents shown on the display 410 of the first computing device 402. This may be useful in showing an extent of questionable activities carried out by the first user 401.

In addition, the master user 403 may also use the master computing device 404 to enable communication with the first user 401 with the first computing device 402. The communication with the first user 401 may be via VoIP, video conference, instant messaging or any messaging protocol over the world wide web 408. It is preferable that the communication between the first user 401 and the master user 403 is enabled over the world wide web 408. The communication with the first user 401 on the first computing device 402 may be possible even after the first computing device 402 has been partially disabled. This may be to allow the first user 401 to remain contactable by the master user 403 even when the first computing device 402 has been partially disabled.

When in the second mode 300, the method 100 may also include the master user 403 referring to the first user's 401 scheduler to ascertain a validity of the activities by the first user 401. The master user 403 may have access to the first user's 401 scheduler, and may be able to determine whether an absence from the location of the first user 401 or activities of the first user 401 is justified.

It should be appreciated that the description in the preceding paragraphs relate to the first user 401 using a plurality of first computing devices 402. The master user 403 may either monitor the first user 401 on each of the first computing device 402 or the online service/storage facility 406 may consolidate all captured activities of the first user 401 across the plurality of first computing devices 402 to enable review by the master user 403 at a subsequent juncture.

Whilst there has been described in the foregoing description preferred embodiments of the present invention, it will be understood by those skilled in the technology concerned that many variations or modifications in details of design or construction may be made without departing from the present invention.

The invention claimed is:

1. A method for monitoring activities of a first user on any of a plurality of platforms, the first user having access to a first computing device for use by the first user, the method including:
    either detecting power consumption of the first computing device above a pre-determined level or detecting at least one of predetermined words, predetermined URLs entered by the first user on the first computing device;
    capturing screenshots of a display of the first computing device at pre-determined intervals;
    storing the screenshots in a storage device;
    capturing text input into the first computing device by the first user;
    storing the text input in the storage device;
    capturing audio input at the first location by the first user;
    storing the audio input in the storage device;
    capturing URLs of internet pages visited by the first user using the first computing device;
    storing the URLs in the storage device;
    capturing video of the first user at the first location; and storing the video in the storage device;
    wherein a master user at any location is able to monitor the activities of the first user in a first mode when a master computing device at any location is offline, and in a second mode when the master computing device at any location is online.

2. The method of claim 1, wherein in the second mode, the method further including:
    alerting the master user with the master computing device of the detection of either power consumption of the first computing device above the pre-determined level or at least one of predetermined words, predetermined URLs entered by the first user on the first computing device;
    replicating the screenshots in sequential order on a screen of the master computing device;
    parsing the stored text input by the first user, seeking either pre-determined words or pre-determined combinations of alphanumeric characters;
    converting the either pre-determined words or pre-determined combinations of alphanumeric characters into an audio form; and
    either
    playing back the audio form of the either pre-determined words or pre-determined combinations of alphanumeric characters on the master computing device; or
    playing back the audio input by the first user on the master computing device.

3. The method of claim 2, further including playing back the video of the first user at a location of the first user on the master computing device.

4. The method of claim 2, wherein the master user is alerted by a notification generated by the second computing device selected from a group comprising: visual, aural, vibrational, and any combination of the aforementioned.

5. The method of claim 4, wherein the notification is transmitted using channels selected from a group comprising: email, SMS, and RSS updates.

6. The method of claim 2, further including using the master computing device to either partially or fully disable the first computing device.

7. The method of claim 2, further including the master user using the master computing device to enable communication with the first user.

8. The method of claim 2, wherein the parsing of the stored text input is done with reference to an updatable list of either the pre-determined words or the pre-determined combinations of alphanumeric characters.

9. The method of claim 2, wherein the screenshots are in a form which renders the content to be visually inoffensive to all parties viewing the video, the form being selected from a group comprising: reverse colour, negative monochrome, and colour filtered.

10. The method of claim 1, wherein in the first mode, the method further includes:
consolidating page captures of the URLs of internet pages visited by the first user using the first computing device;
storing the consolidated page captures at the storage device; and
when the master computing device is online,
either presenting the URLs of internet pages visited by the first user using the first computing device when the master computing device is online, or presenting a video of the consolidated page captures of the URLs of internet pages visited by the first user using the first computing device.

11. The method of claim 10, wherein either the video of the consolidated page captures or the URLs of internet pages visited by the first user using the first computing device indicates a duration spent viewing each URL, with the duration spent viewing each URL being the time that the URL is in an active browser window.

12. The method of claim 10, wherein the page captures are scaled down to fit a single video frame, with an actual content of each page capture being less important than a topical emphasis of the page capture.

13. The method of claim 10, wherein the video is played back at an accelerated frame rate to minimize a time which the master user needs to view the video.

14. The method of claim 10, wherein the video is in a form which renders the content to be visually inoffensive to all parties viewing the video, the form being selected from a group comprising: reverse colour, negative monochrome, and colour filtered.

15. The method of claim 1, wherein the pre-determined level is a power level for a stand-by mode of the first computing device.

16. The method of claim 1, wherein the pre-determined time intervals are durations selected from a group comprising: quarter minute, half a minute, one minute, three minutes, five minutes, and ten minutes.

17. The method of claim 1, wherein capturing text input includes counting keystrokes of the first user.

18. The method of claim 1, wherein the storage device is functionally connected to the first computing device either via a wired connection or via a wireless connection.

19. The method of claim 18, wherein the storage device functionally connected to the first computing device via the wireless connection is an online service/storage facility.

20. The method of claim 19, wherein the online service/storage facility consolidates all captured activities of the first user across the plurality of first computing devices to enable review by the master user at a subsequent juncture.

21. The method of claim 1, wherein the URLs of internet pages visited by the first user using the first computing device includes information relating to a duration spent viewing each URL, with the duration spent viewing each URL being the time that the URL is in an active browser window.

22. The method of claim 2, further including the master user referring to the first user's scheduler to ascertain a validity of the activities by the first user.

23. The method of claim 10, further including the master user referring to the first user's scheduler to ascertain a validity of the activities by the first user.

24. The method of claim 1 being disabled when either the power consumption of the first computing device is below the pre-determined level or processor usage of the first computing device is below a pre-determined percentage of a full capability of the processor.

* * * * *